US008197338B2

(12) United States Patent
Fitzsimons et al.

(10) Patent No.: US 8,197,338 B2
(45) Date of Patent: Jun. 12, 2012

(54) SUSPENDING WAGERING GAME PLAY ON WAGERING GAME MACHINES

(75) Inventors: Matthew R. Fitzsimons, Lake in the Hills, IL (US); Steven J. Lee, Naperville, IL (US)

(73) Assignee: WMS Gaming Inc., Waukegan, IL (US)

(*) Notice: Subject to any disclaimer, the term of this patent is extended or adjusted under 35 U.S.C. 154(b) by 867 days.

(21) Appl. No.: 12/280,139

(22) PCT Filed: Feb. 23, 2007

(86) PCT No.: PCT/US2007/004838
§ 371 (c)(1),
(2), (4) Date: Aug. 20, 2008

(87) PCT Pub. No.: WO2007/100725
PCT Pub. Date: Sep. 7, 2007

(65) Prior Publication Data

US 2010/0167810 A1 Jul. 1, 2010

Related U.S. Application Data

(60) Provisional application No. 60/743,351, filed on Feb. 24, 2006, provisional application No. 60/746,666, filed on May 8, 2006.

(51) Int. Cl.
*A63F 13/12* (2006.01)

(52) U.S. Cl. ................ 463/29; 463/25; 463/39; 463/40; 463/42; 273/138.2; 273/317.1; 273/460; 273/461; 348/553; 348/608; 348/636; 348/706; 455/41.2; 455/151.2; 455/226.2; 455/513; 714/47.1; 714/47.2; 714/48; 714/49

(58) Field of Classification Search .................... 463/16, 463/20, 22–23, 30–34, 40, 42–43, 25, 29, 463/39; 273/108.1, 138.2, 139, 141 A, 142 R, 273/143 C, 142 B, 142 H, 317.1, 460–461; 345/1.1, 11, 14, 204, 211–213; 348/553, 348/559–560, 563, 567–568, 607–624, 634–637, 348/704–706, 731–732; 455/41.2, 134, 136, 455/138, 140, 151.2, 153.2, 226.2, 420, 512–513; 709/203–207, 213, 216–219, 225, 227, 230–232, 709/245; 714/47.1–47.3, 48–49, 735–737; *A63F 13/12*
See application file for complete search history.

(56) References Cited

U.S. PATENT DOCUMENTS 4,890,332 A * 12/1989 Takahashi .................. 455/67.13
(Continued)

FOREIGN PATENT DOCUMENTS

WO WO-2007100725 A3 9/2007

OTHER PUBLICATIONS

"International Application Serial No. PCT/US2007/04838, Search Report mailed Jun. 10, 2008", 4 pgs.

(Continued)

*Primary Examiner* — Arthur O. Hall
(74) *Attorney, Agent, or Firm* — Schwegman, Lundberg & Woessner, P.A.

(57) ABSTRACT

Systems and methods for suspending wagering game play on wagering game machines are described herein. In one embodiment, the method includes receiving a content signal associated with regulated operations. The method can also include determining whether an enable signal is detected. Additionally, if the enable signal is not detected, the method can call for prohibiting performance of the regulated operations.

20 Claims, 11 Drawing Sheets

U.S. PATENT DOCUMENTS

| | | | | |
|---|---|---|---|---|
| 5,408,693 | A * | 4/1995 | Alton et al. | 455/212 |
| 5,542,119 | A * | 7/1996 | Grube et al. | 455/503 |
| 6,418,557 | B1 * | 7/2002 | Otani | 725/96 |
| 6,463,294 | B1 * | 10/2002 | Holma et al. | 455/513 |
| 6,699,123 | B2 * | 3/2004 | Matsuura et al. | 463/31 |
| 6,846,238 | B2 * | 1/2005 | Wells | 463/39 |
| 7,420,627 | B2 * | 9/2008 | Takagi et al. | 348/725 |
| 7,455,591 | B2 * | 11/2008 | Nguyen | 463/42 |
| 7,465,232 | B2 * | 12/2008 | Okada | 463/42 |
| 7,519,351 | B2 * | 4/2009 | Malone, III | 455/404.1 |
| 7,546,142 | B2 * | 6/2009 | Ginzburg et al. | 455/552.1 |
| 8,041,319 | B2 * | 10/2011 | He et al. | 455/144 |
| 2003/0003997 | A1 * | 1/2003 | Vuong et al. | 463/42 |
| 2004/0002385 | A1 * | 1/2004 | Nguyen | 463/42 |
| 2004/0235439 | A1 * | 11/2004 | Husted et al. | 455/136 |
| 2005/0253825 | A1 * | 11/2005 | Kawamura et al. | 345/204 |

OTHER PUBLICATIONS

"International Application Serial No. PCT/US2007/04838, Written Opinion mailed Jun. 10, 2008", 5 pgs.

* cited by examiner

SUSPENDING WAGERING GAME PLAY ON WAGERING GAME MACHINES

RELATED APPLICATIONS

This patent application is a U.S. National Stage Filing under 35 U.S.C. 371 from International Patent Application Serial No. PCT/US2007/004838, filed Feb. 23, 2007, and published on Sep. 7, 2007 as WO 2007/100725 A2, which claims the priority benefit of U.S. Provisional Patent Application Ser. No. 60/743,351 filed Feb. 24, 2006 and entitled “SUSPENDING PLAY ON A WIRELESS PORTABLE GAMING DEVICE”, and of U.S. Provisional Patent Application Ser. No. 60/746,666 filed May 8, 2006 and entitled “SUSPENDING WAGERING GAME PLAY ON WAGERING GAME MACHINES”, the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wagering game systems, and more particularly, to wagering game systems that can suspend wagering game play based on wireless signals.

BACKGROUND

Wagering game machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

The present invention is illustrated by way of example and not limitation in the Figures of the accompanying drawings in which.

DESCRIPTION OF THE EMBODIMENTS

Systems and methods for suspending wagering game play on wagering game machines are described herein. This description of the embodiments is divided into five sections. The first section provides an introduction to embodiments of the invention. The second section describes an example operating environment, the third section describes example operations performed by embodiments of the invention, and the fourth section describes an example wagering game machine. The fifth section presents some general comments.

Introduction

Gaming providers often need to place limits on where and when their wagering game machines can perform certain operations. For example, in some jurisdictions, state regulations limit where wagering games can be played. The regulations may allow wagering game play on casinos' main floors, while prohibiting wagering game play in their restaurants and hotel rooms. Gaining providers may also want to limit wagering game machine operations based on licensing restrictions. For example, a casino's wagering game license may limit use to certain times or locations.

Some embodiments of the invention enable gaming providers to limit where and when their wagering game machines can perform certain operations. In particular, some embodiments enable gaming providers to define areas in which their wagering game machines can present wagering games and other restricted content. If the wagering game machines leave the defined areas, the wagering game machines will not present the wagering games and other restricted content. In order to avoid accidentally terminating wagering games and other operations, some embodiments inform players before they roam outside the defined areas.

Example Operating Environment

Example Wagering Game Networks

Figure 1:
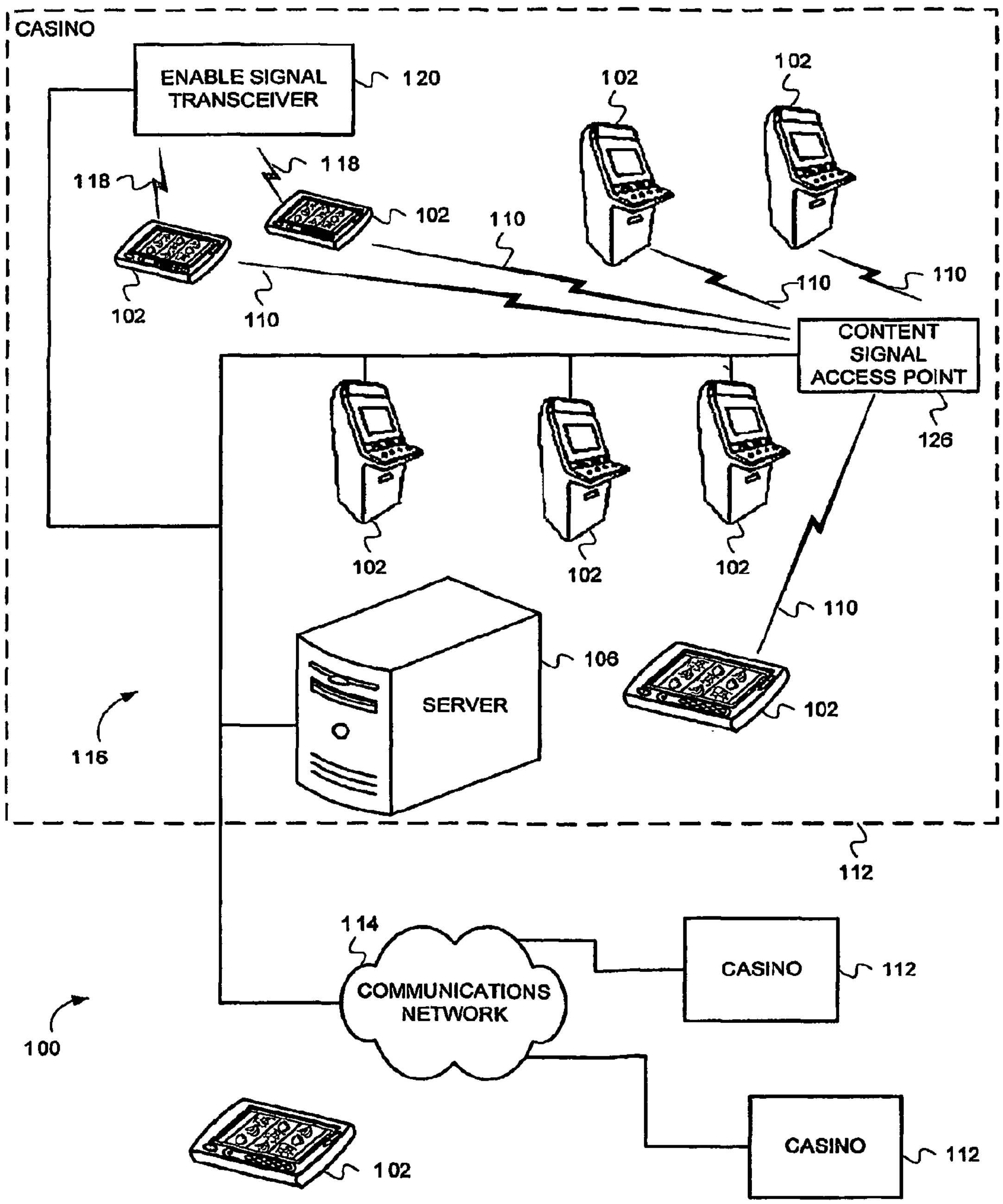
FIG. 1 is a block diagram illustrating a wagering game network in which wagering game machines can limit certain operations, according to example embodiments of the invention.

FIG. 1 is a block diagram illustrating a wagering game network in which wagering game machines can preclude certain operations, according to example embodiments of the invention. As shown in FIG. 1, the wagering game network 100 includes a plurality of casinos 112 connected to a communications network 114. Each of the plurality of casinos 112 includes a local area network 116, which includes wagering game machines 102, server 106, content signal access point 126, and enable signal transceiver 120. As shown, the local area network 116 includes wired and wireless communication links that can employ any suitable connection technology, such as Bluetooth, the IEEE 802.11 group of standards, Ethernet, public switched telephone networks, SONET, etc.

The server 106 can serve wagering games and/or distribute other content to devices located in the local area network 116, other casinos 112, or other locations on the network 114.

The enable signal transceiver 120 transmits enable signals 118 to the wagering game machines 102. In one embodiment, if the wagering game machines 102 cannot detect an enable signal 118, they will not perform certain "regulated operations." For example, if a wagering game machine 102 cannot detect an enable signal 118, it will not present wagering games. The regulated operations can include operations for presenting wagering games, presenting copyrighted content, etc. The enable signal transceiver 120 can include any wireless technology (e.g., a Bluetooth transceiver, 802.11 transceiver, RFID transceiver, infrared transceiver, etc.) suitable for wirelessly transmitting the enable signals 118 to the wagering game machines 102. The enable signals 118 can include relatively low-power short-range radio frequency signals, such as a Bluetooth or RFID signals. Alternatively, the enable signals 118 can include any suitable signal type, such as IEEE 802.11, GSM, infrared, etc. In one embodiment, the enable signals include data originating at the server 106.

In one embodiment, the content signal access point 126 transmits content signals 110 to the wagering game machine 102. Some wagering game machines 102 can suspend performance of restricted operations based on the quality of the content signals 110. For example, if a wagering game machine 102 determines that the strength of a content signal 110 has dropped below a given threshold, the wagering game machine 102 can suspend performance of certain operations. After the wagering game machine 102 determines that the strength of the content is above the threshold, it can resume performance of the operations.

The content signals 110 can include wagering game content, i.e., content for use in presenting a wagering game on a wagering game machine 102, or any other suitable content. For example, the content signals 110 can include content that is not used in presenting wagering games, such as entertainment, informational, or instructional content. The wagering game content and/or non-wagering-game content can originate at the server 106. The wagering game machines 102 can use non-wagering-game content when they are located in areas where wager-based gaming is prohibited (i.e., where the wagering game machines 102 will not perform the regulated operations). The wagering game machines 102 can use data in the content signals 110 to present information from the World Wide Web, tutorials for educating novice gamblers on how to use the wagering game machines 102, tutorials about how to play wagering games, etc. In one embodiment, the content signals 110 have a broader range (i.e., transmit farther) than the enable signals 118.

The wagering game machines 102 and server 106 can include hardware and machine-readable media including instructions for performing the operations described herein. The wagering game machines 102 described herein can take any suitable form, such as floor standing models, handheld mobile units, bartop models, workstation-type console models, etc. Further, the wagering game machines 102 can be primarily dedicated for use in conducting wagering games, or can include non-dedicated devices, such as mobile phones, personal digital assistants, personal computers, etc. In one embodiment, the wagering game network 100 can include other network devices, such as accounting servers, wide area progressive servers, player tracking servers, and/or other devices suitable for use in connection with embodiments of the invention.

Figure 2:
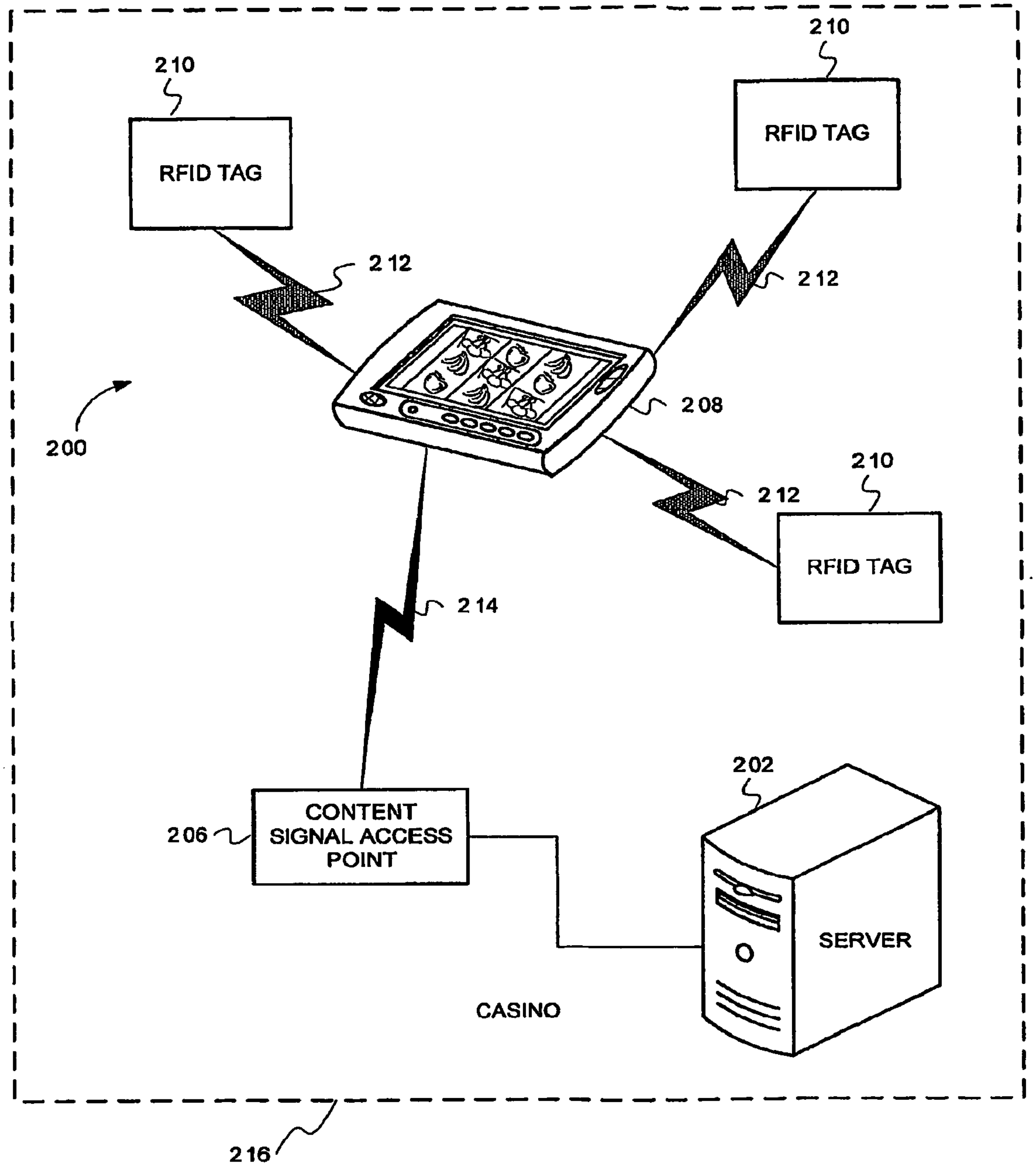
FIG. 2 is a block diagram illustrating an alternative wagering game network in which wagering game machines can limit certain operations, according to example embodiments of the invention.

FIG. 2 is a block diagram illustrating an alternative wagering game network in which wagering game machines can preclude certain operations, according to example embodiments of the invention. The network 200 includes a server 202, content signal access point 206, wagering game machine 208, and RFID tags 210. Although FIG. 2 does not show all the details illustrated in FIG. 1, the network 200 can include all the components of the network 100.

In the network 200, the wagering game machine 208 includes an RFID transceiver (not shown) that can request information from the RFID tags 210. The wagering game machine 208 receives wagering game content or other content via the wireless signal 214. In one embodiment, if the wagering game machine 208 does not receive a response (via signal 212) from an RFID tag 210, the wagering game machine 208 will terminate performance of regulated operations, such as presenting wagering games and/or other restricted content. In one embodiment, gaming providers can define restricted areas by placing the RFID tags 210 throughout the casino 216.

Figure 3:
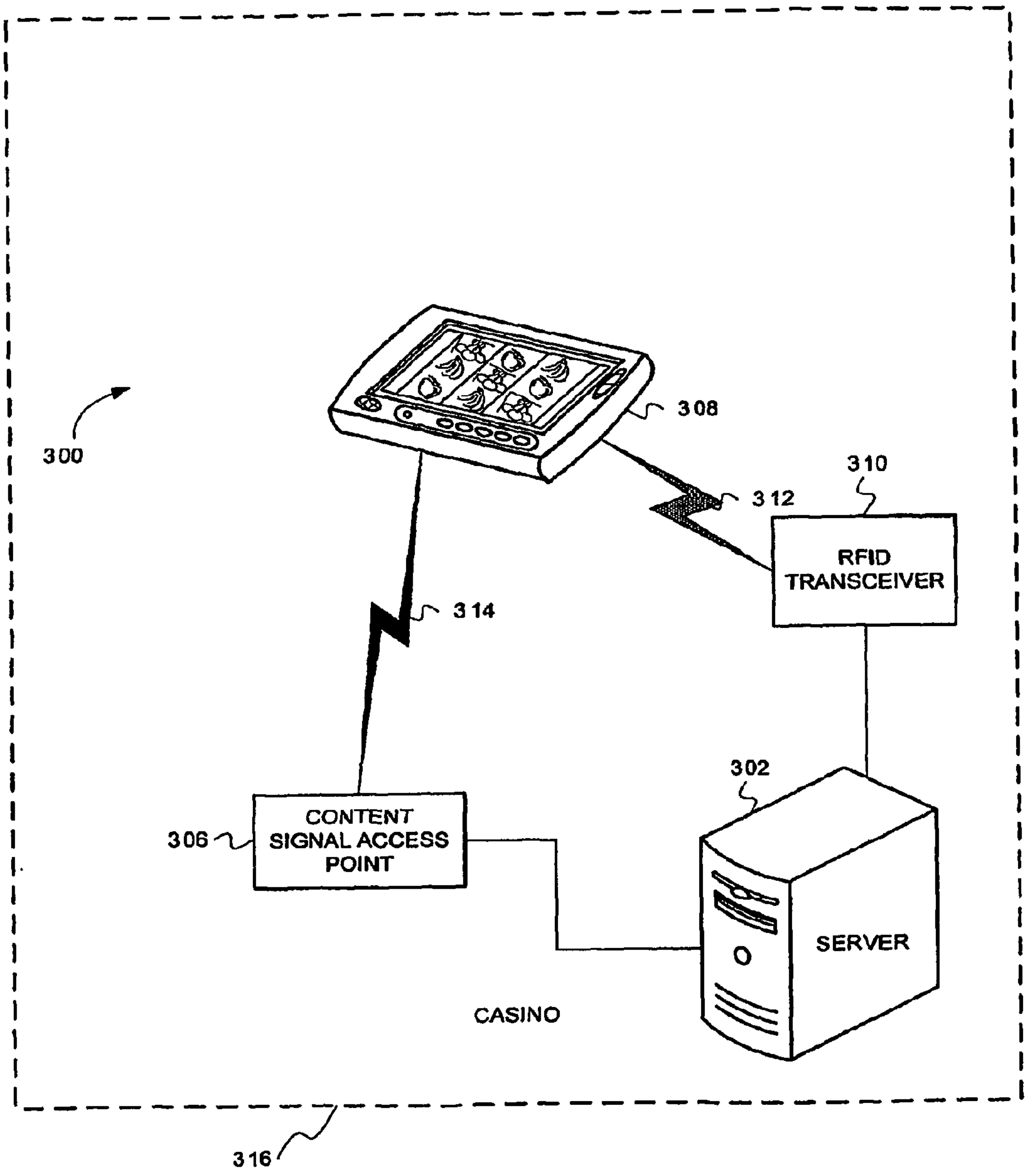
FIG. 3 is a block diagram illustrating an alternative wagering game network in which a server can limit certain operations of a wagering game machine, according to example embodiments of the invention.

FIG. 3 is a block diagram illustrating yet another wagering game network in which a server can limit certain operations of a wagering game machine, according to example embodiments of the invention. The network 300 includes a server 302, content signal access point 306, wagering game machine 308, and RFID transceiver 310. Although FIG. 3 does not show all the details illustrated in FIG. 1, the network 300 can include all the components of the network 100.

In the network 300, the wagering game machine 308 includes RFID tags (not shown). The wagering game machine 308 can receive wagering game content or other content via the wireless signal 314. The wagering game machine's RFID tags can receive and respond to requests for information from the RFID transceiver 310. In one embodiment, if the RFID transceiver 310 does not receive a response (via signal 312) from a wagering game machine's RFID tag, the server 310 will transmit to the wagering game machine 314 an indication (via signal 314) to suspend certain regulated operations. In one embodiment, gaming providers can define restricted areas by placing the RFID transceivers 310 throughout the casino 316.

Example Wagering Game Machine Architecture

Figure 4:
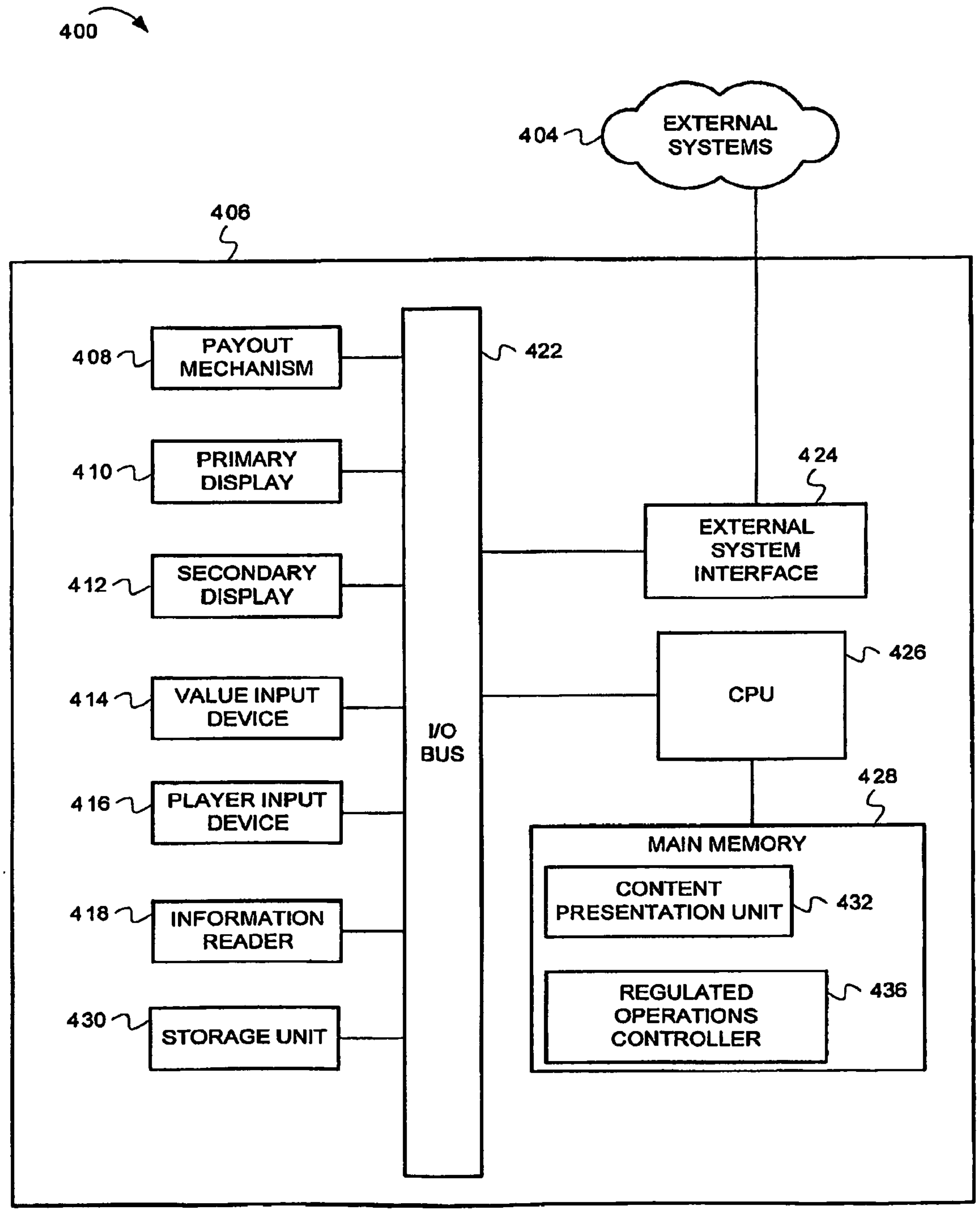
FIG. 4 is a block diagram illustrating a wagering game machine architecture, according to example embodiments of the invention.

FIG. 4 is a block diagram illustrating a wagering game machine architecture, according to example embodiments of the invention. As shown in FIG. 4 the wagering game machine 406 includes a central processing unit (CPU) 426 connected to main memory 428, which includes a content presentation unit 432 and regulated operations controller 436. In one embodiment, the content presentation unit 432 can present wagering games, such as video poker, video black jack, video slots, video lottery, etc., in whole or part. The content presentation unit 432 can also present other content, such as instructional content, entertainment content, or any other information available on the World Wide Web or other networks.

In one embodiment, the regulated operations controller 436 determines when the content presentation unit 432 can perform regulated operations, such as presenting wagering games and/or other restricted content. For example, in one embodiment, if the regulated operations controller 436 determines that the external system interface 424 can not detect an enable signal or a response from an RFID tag, the regulated operations controller 436 prohibits the content presentation unit 432 from performing restricted operations. In another embodiment, the regulated operations controller 436 can use thresholds for signal strength, bit error rate, or other metrics to suspend restricted operations before loosing a content signal. For example, when signal strength dips below a threshold, the regulated operations controller 436 suspends presentation of a wagering game. After the signal strength increases above the threshold, the regulated operations controller 436 allows presentation of the wagering game to resume.

The CPU 426 is also connected to an input/output (I/O) bus 422, which facilitates communication between the wagering game machine's components. The I/O bus 422 is connected to a payout mechanism 408, primary display 410, secondary display 412, value input device 414, player input device 416, information reader 418, and storage unit 430. The player input device 416 can include the value input device 414 to the extent the player input device 416 is used to place wagers. The I/O bus 422 is also connected to an external system interface 424, which is connected to external systems 404 (e.g., wagering game networks). The external system interface 424 can include any technology suitable for communicating with RFID tags 210, content signal access points 126, enable signal transceivers 120, and other network devices.

In one embodiment, the wagering game machine 406 can include additional peripheral devices and/or more than one of each component shown in FIG. 4. For example, in one embodiment, the wagering game machine 406 can include multiple external system interfaces 424 and multiple CPUs 426. In one embodiment, any of the components can be integrated or subdivided. Additionally, in one embodiment, the components of the wagering game machine 406 can be interconnected according to any suitable interconnection architecture (e.g., directly connected, hypercube, etc.).

In one embodiment, any of the components of the wagering game machine 406 (e.g., the content presentation unit 432) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 4 describes example embodiments of a wagering game machine, FIG. 1 shows how a plurality of wagering game machines can be connected in a wagering game network.

Example Wireless Environment

In some embodiments, the devices on the network 100 can receive orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, devices on the network 100 can communicate in accordance with a broadband multiple access technique, such as orthogonal frequency division multiple access (OFDMA). In some embodiments, the devices on the network 100 can communicate using spread-spectrum signals.

In some embodiments, the content signal access point 126 can be part of a communication station, such as wireless local area network (WLAN) communication station including a Wireless Fidelity (WiFi) communication station, or a WLAN access point (AP). In these embodiments, the wagering game machines 102 can be part of a mobile station, such as WLAN mobile station or a WiFi mobile station.

In some other embodiments, the content signal access point 126 can be part of a broadband wireless access (BWA) network communication station, such as a Worldwide Interoperability for Microwave Access (WiMax) communication station, as the content signal access point 126 can be part of almost any wireless communication device. In these embodiments, the wagering game machines 102 can be part of a BWA network communication station, such as a WiMax communication station.

In some embodiments, any of the wagering game machines 102 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the frequency spectrums for the communication signals transmitted and received by the content signal access point 126 and the wagering game machines 102 can comprise either a 5 gigahertz (GHz) frequency spectrum or a 2.4 GHz frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5 GHz. In some BWA network embodiments, the frequency spectrum for the communication signals can comprise frequencies between 2 and 11 GHz.

In some embodiments, the devices on the network 100 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, as they can also be suitable to transmit and/or receive communications in accordance with other techniques and standards. In some BWA network embodiments, the devices on the network 100 can communicate RF signals in accordance with the IEEE 802.16-2004 and the IEEE 802.16 (e) standards for wireless metropolitan area networks (WMANs) including variations and evolutions thereof, as they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," CAN 2005 and related amendments/versions.

In some embodiments, the content signal access point 126 and the wagering game machines 102 can include one or more antennas (not shown). These antennas can comprise directional or omnidirectional antennas, including, for example, dipole antennas, monopole antennas, patch antennas, loop antennas, microstrip antennas or other types of antennas suitable for transmission of the RF signals. In some multiple-input, multiple-output (MIMO) embodiments, two or more antennas can be used. In some embodiments, instead of two or more antennas, a single antenna with multiple apertures can be used. In these multiple aperture embodiments, each aperture can be considered a separate antenna. In some multi-antenna embodiments, each antenna can be effectively separated to take advantage of spatial diversity and the different channel characteristics that can result between each of the antennas and another wireless communication device. In some multi-antenna embodiments, the antennas of a device can be separated by up to 1/10 of a wavelength or more.

In embodiment including multiple access points, handoffs between different access points can be performed based on a signal-to-noise ratio (SNR), a signal-to-noise and interference ratio (SNIR), a bit-error rate (BER), or an energy per received bit.

In some embodiments, the devices on the network 100 can communicate in accordance with standards such as the Pan-European mobile system standard referred to as the Global System for Mobile Communications (GSM). In some embodiments, the devices on the network 100 can also communicate in accordance with packet radio services such as the General Packet Radio Service (GPRS) packet data communication service. In some embodiments, the devices on the network 100 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the devices on the network 100 can provide packet data services (PDS) utilizing packet data protocols (PDP). In other embodiments, the devices on the network 100 can communicate in accordance with other standards or other air-interfaces including interfaces compatible with the enhanced data for GSM evolution (EDGE) standards (see 3GPP Technical Specification, Version 3.2.0, March 2000).

In other embodiments, the devices on the network 100 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the devices on the network 100 can communicate in accordance with an ultra-wideband (UWB) communication technique where a carrier frequency is not used. In other embodiments, the devices on the network 100 can communicate in accordance with an analog communication technique. In other embodiments, the devices on the network 100 can communicate in accordance with an optical communication technique, such as the Infrared Data Association (IrDA) standard. In some embodiments, the devices on the network 100 can communicate in accordance with the Home-RF standard which can be in accordance with a Home-RF Working Group (HRFWG) standard.

Example Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., firmware). In some embodiments, the operations can be performed by executing instructions received across a network. In some embodiments the operations are performed in series, while in other embodiments, the operations can be performed in parallel.

Figure 5:
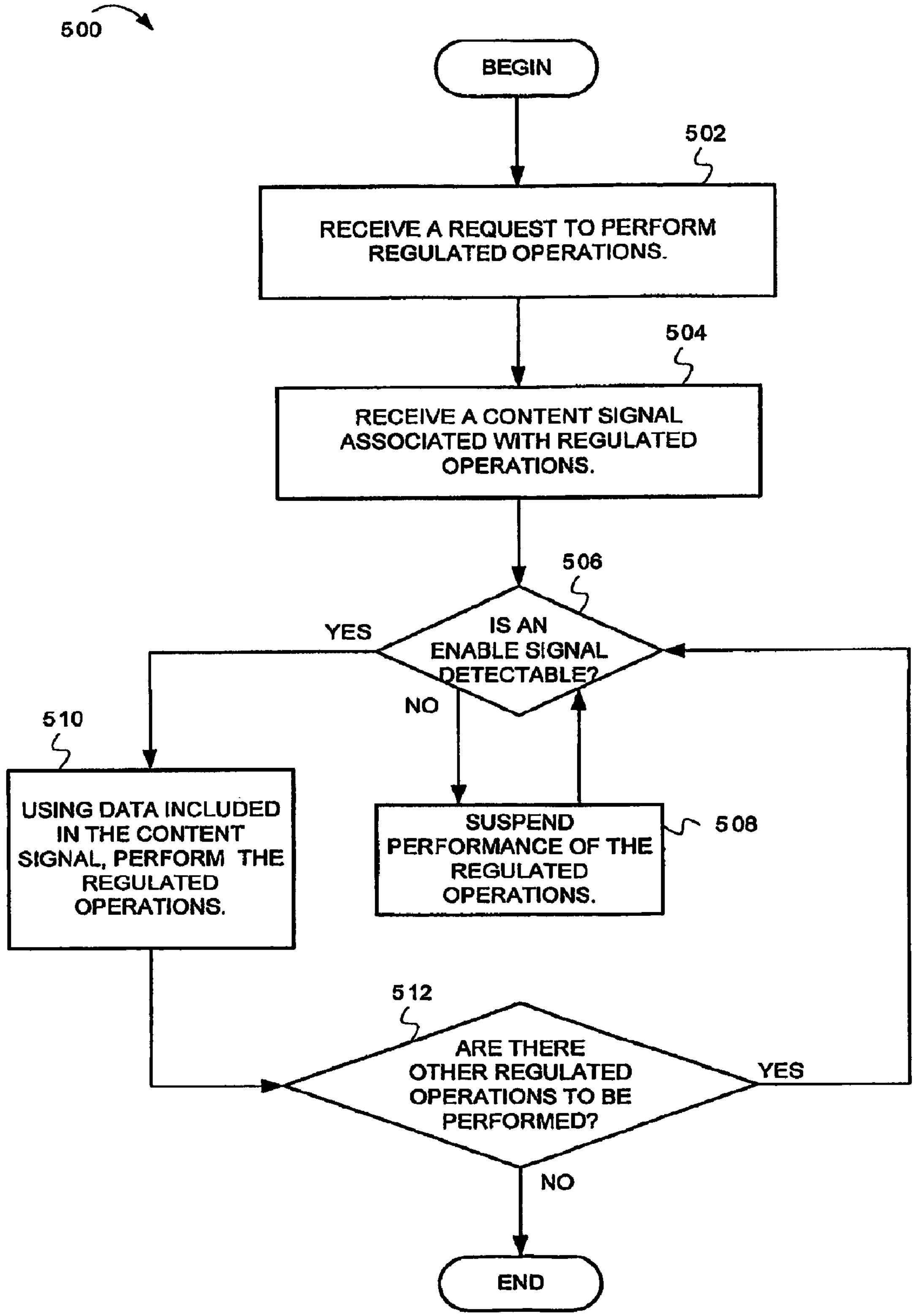
FIG. 5 is a flow diagram illustrating operations for using a plurality of signals for disabling certain operations in a wagering game machine, according to example embodiments of the invention.

FIG. 5 is a flow diagram illustrating operations for using one or more signals for disabling certain operations in a wagering game machine, according to example embodiments of the invention. In FIG. 5, the flow 500 begins at block 502.

At block 502, a wagering game machine's content presentation unit 432 receives a request to perform regulated operations. For example, the content presentation unit 432 receives a request, via a graphical interface, to present a wagering game or present other restricted content. The flow continues at block 504.

At block 504, the wagering game machine's external system interface 424 receives a content signal 110 associated with the request to perform regulated operations. In one embodiment, the content signal conforms to a first wireless protocol, such as IEEE 802.11. The external system interface 424 can pass the content signal's content to the content presentation unit 432 for use in presenting a wagering game or other restricted content. The flow continues at block 506.

At block 506, the wagering game machine's regulated operations controller 436 determines whether an enable signal 118 is detectable. In one embodiment, the enable signal 118 conforms to a second communication protocol, such as Bluetooth or a communication protocol based on infrared light signals. In one embodiment, data included in the enable signal 118 can originate at the server 106 or another device connected to the local area network 116 or communications network 114. If an enable signal is detectable, the flow continues at block 510. Otherwise, the flow continues at block 508.

At block 508, the regulated operations controller 436 suspends performance of the regulated operations. For example, the regulated operations controller 436 suspends presentation of a wagering game or presentation of other restricted content (e.g. licensed content). The regulated operations controller 436 can suspend regulated operations by sending to the content presentation unit 432 a signal or other data indicating that regulated operations are to be suspended. Alternatively, the regulated operations controller 436 can record an indication to a memory location addressable by the content presentation unit 432. The flow continues at block 506.

At block 510, the content presentation unit 432 performs regulated operations using content included in the content signal 110. For example, the content presentation unit 432 presents a wagering game using wagering game content included in the content signal 110. The flow continues at block 512.

At block 512, the content presentation unit 432 determines whether there are additional regulated operations to be performed. If there are additional regulated operations to be performed the flow continues at block 506. Otherwise, the flow ends.

Figure 6:
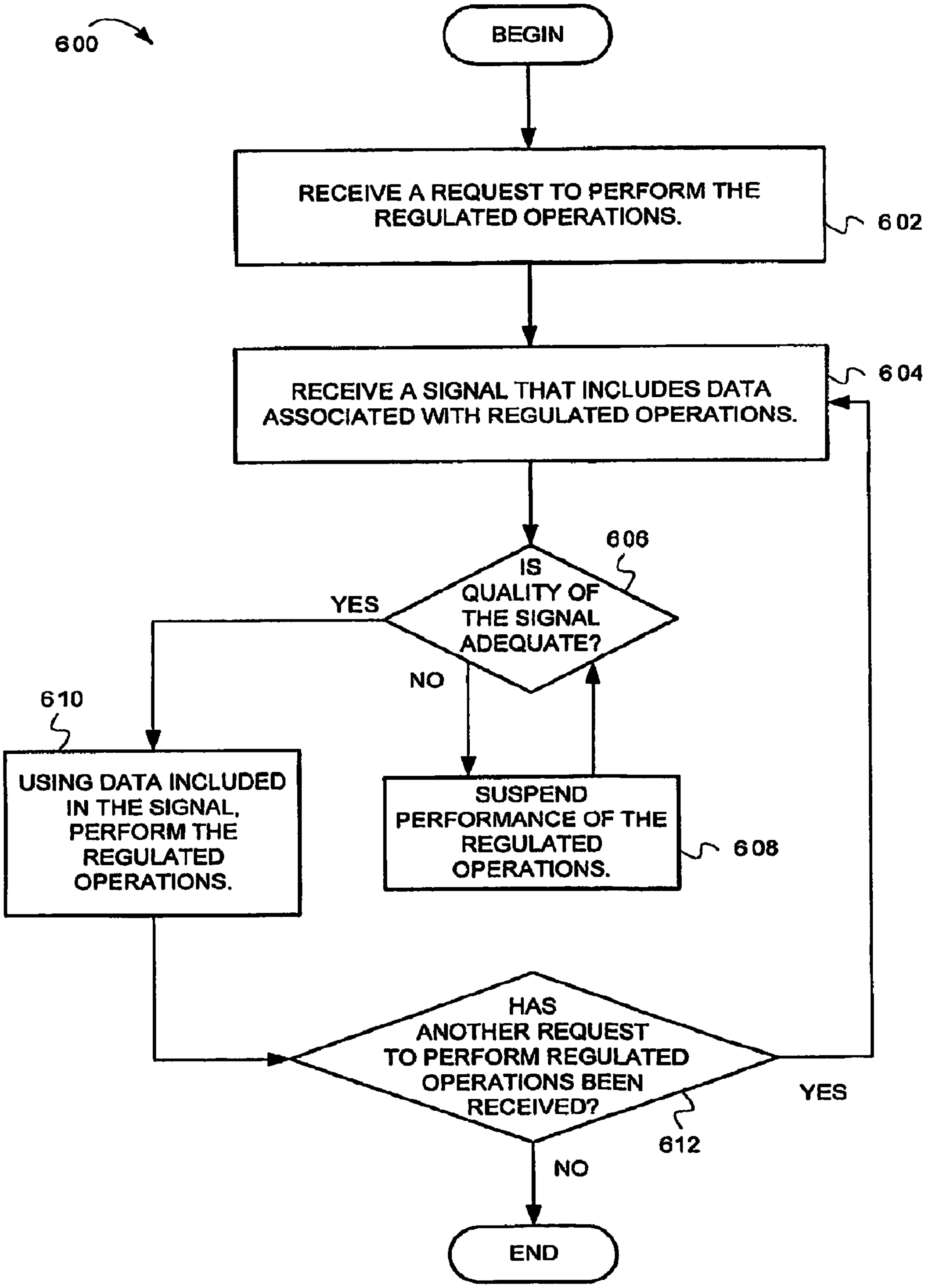
FIG. 6 is a flow diagram illustrating operations for disabling and resuming certain operations in a wagering game machine based on signal quality, according to example embodiments of the invention.

While FIG. 5 describes disabling regulated operations based on one or more signals, FIG. 6 describes disabling regulated operations based on signal quality.

FIG. 6 is a flow diagram illustrating operations for disabling and resuming certain operations in a wagering game machine based on signal quality, according to example embodiments of the invention. In FIG. 6, the flow 600 begins at block 602.

At block 602, a wagering game machine's content presentation unit 432 receives a request to perform regulated operations. For example, the content presentation unit 432 receives a request, via a graphical interface, to present a wagering game or present other licensed content. The flow continues at block 604.

At block 604, the wagering game machine's external system interface 424 receives a signal including content associated with regulated operations. For example, a wagering game machine receives a content signal 110 that includes wagering game content, licensed content, or other restricted content. The flow continues at block 606.

At block 606, the wagering game machine's regulated operations controller 436 determines whether quality of the signal is adequate for performing restricted operations. For example, the regulated operations controller 236 determines whether the strength of the content signal 110 is above a threshold necessary for performing restricted operations. In one embodiment, the signal quality changes as a wagering game machine 102 move about; thus, if a wagering game machine 102 moves outside an approved area, the signal quality becomes inadequate.

In one embodiment, signal quality is determined based on a Received Signal Strength Indicator maintained by the external system interface 424. In another embodiment, the determination can be based on a bit error rate associated with the signal. In other embodiments, other techniques can be used for evaluating signal quality. If the quality of the signal is adequate, the flow continues at block 610. Otherwise, flow continues at block 608.

At block 608, the regulated operations controller 436 suspends performance of the regulated operations. For example, if the signal quality is inadequate, the regulated operations controller 436 suspends presentation of a wagering game. In one embodiment, the wagering game machine 102 informs the server 106 that it has suspended regulated operations. The flow continues at block 606.

At block 610, after the regulated operations controller 436 determined that the signal quality is adequate (at block 606), the content presentation unit 432 performs regulated operations using data included in the signal. For example, the content presentation unit 432 presents a wagering game using content included in the content signal 110. In one embodiment, the regulated operations controller 436 resumes regulated operations (e.g., resumes a wagering game) after it was suspended at block 608. The flow continues at block 612.

At block 612, the content presentation unit 432 determines whether it has received another request to perform regulated operations. If it is received another request, the flow continues at block 604. Otherwise, the flow ends.

This description continues with a discussion embodiments in which a server can stop a wagering game machine's regulated operations.

Figure 7:
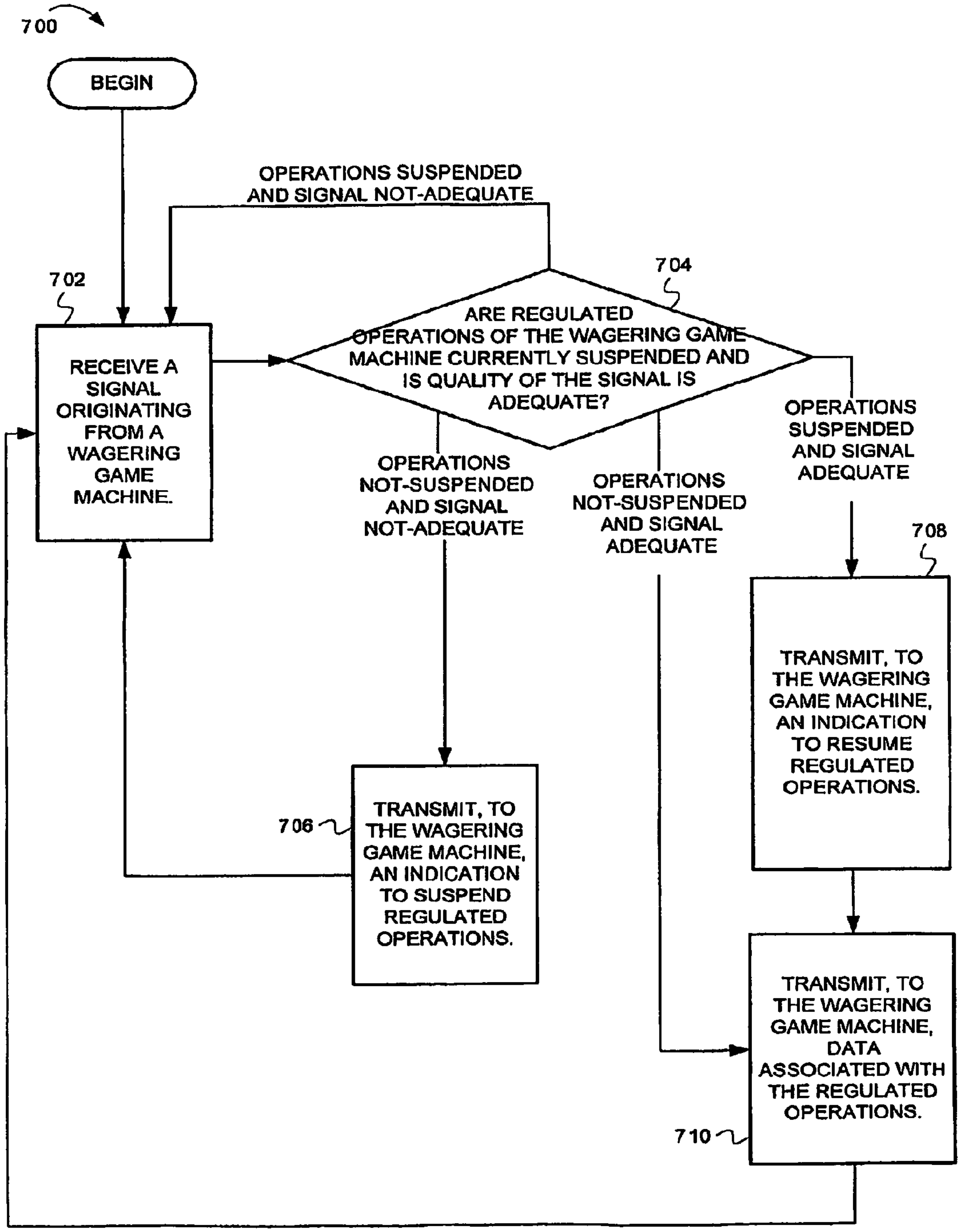
FIG. 7 is a flow diagram illustrating operations disabling and resuming regulated operations on a remote wagering game machine, according to example embodiments of the invention.

FIG. 7 is a flow diagram illustrating operations disabling and resuming regulated operations on a remote wagering game machine, according to example embodiments of the invention. In FIG. 7, the flow 700 begins at block 702.

At block 702, a server 106 receives a signal originating from a wagering game machine. The server 106 can receive the wagering game machine's signal via the content signal access point 126. In one embodiment, the signal includes data indicating the signal quality (e.g. signal strength, error rate, etc.). The flow continues at block 704.

At block 704, the server 106 determines whether regulated operations of the wagering game machine are currently suspended and whether signal quality is adequate. There are four paths leaving block 704: 1) if regulated operations are suspended and the signal quality is not adequate, the flow continues at block 702; 2) if regulated operations are not suspended and signal quality is not adequate, the flow continues at block 706; 3) if regulated operations are not suspended and signal quality is adequate, the flow continues at block 710; and 4) if regulated operations are suspended and signal quality is adequate, the flow continues at block 708.

At block 706, after determining that regulated operations are suspended and signal strength is adequate (see block 704), the server 106 transmits to the wagering game machine 102 an indication to suspend regulated operations. The flow continues at block 702.

At block 708, after determining operations were suspended and signal strength is adequate (see block 704), the server 106 transmits to the wagering game machine 102 an indication to resume regulated operations. After the wagering game machine 102 receives the indication, it can resume wagering games or other operations. The flow continues at block 710.

At block 710, after determining operations were not suspended and signal strength is adequate (see block 704), the server 106 transmits data destined for the wagering game machine 102, where the data is associated with the regulated operations. For example, the server 106 transmits wagering game content that can be used for presenting a wagering game on the wagering game machine 102. The flow continues at block 702.

Figure 8:
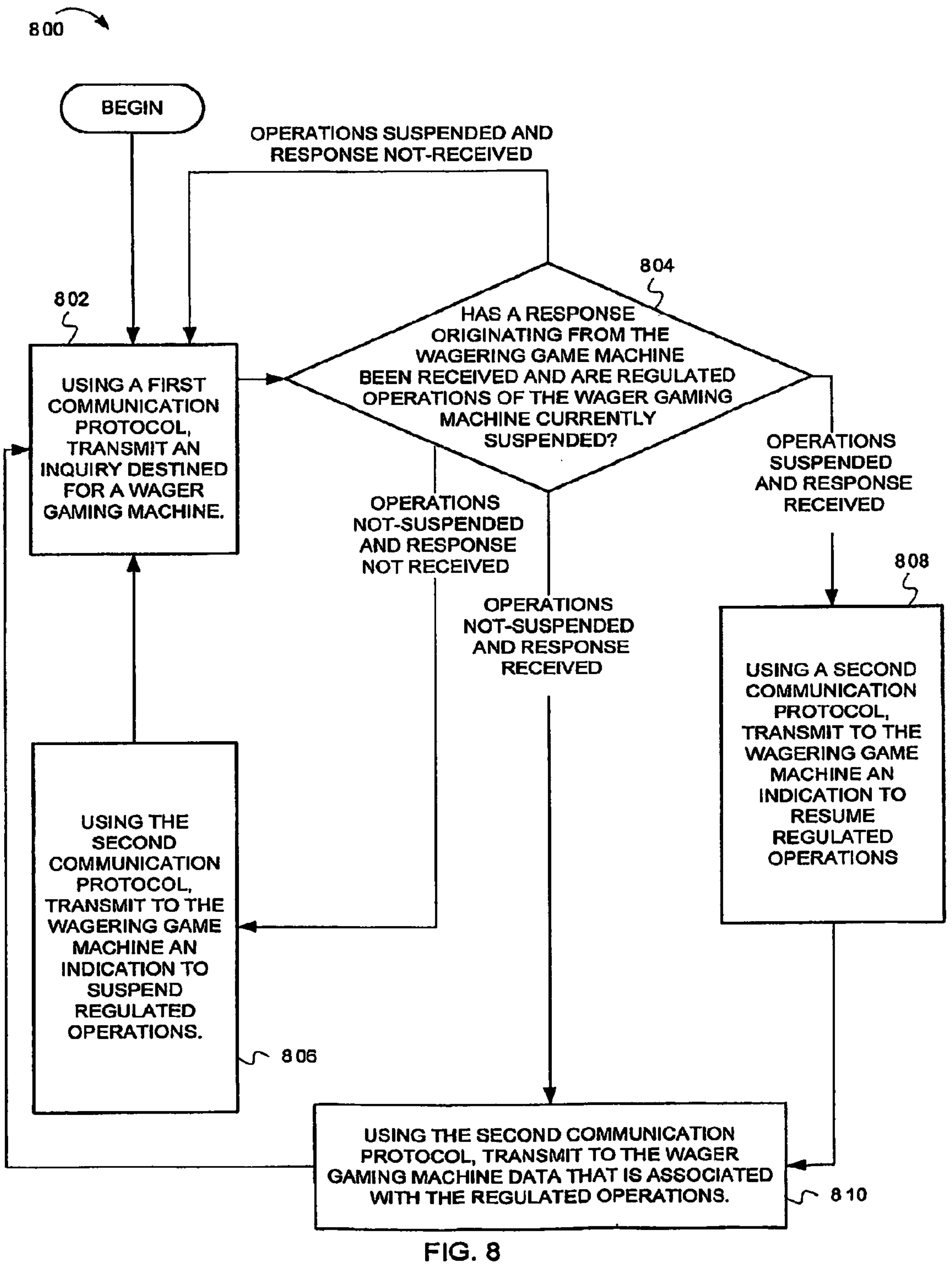
FIG. 8 is a flow diagram illustrating operations for remotely disabling and resuming a wagering game machine's regulated operations based on a plurality of signals.

This description continues with a discussion of FIG. 8, which describes remotely disabling a gaming machine's regulated operations using a plurality of signals.

FIG. 8 is a flow diagram illustrating operations for remotely disabling a wagering game machine's regulated operations based on a plurality of communication signals. In FIG. 8, the flow 800 begins at block 802.

At block 802, a server 302 transmits, using a first communication protocol, an inquiry destined for a wagering game machine 308. In one embodiment, the server 302 transmits the inquiry via an RFID signal 312. The RFID signal transceiver 310 can transmit inquiries to RFID tags on the wagering game machines 308. The RFID signal transceiver's RFID signals can conform to any suitable RFID communication protocol. The flow continues at block 804.

At block 804, the server 302 determines whether a response has been received from the wagering game machine 308 (e.g., from the wagering game machine's RFID tag) and whether regulated operations are currently suspended on the wagering game machine 308. There are four paths leaving block 804: 1) if regulated operations have been suspended and a response has not been received, the flow continues at block 802; 2) if regulated operations are suspended and a response has been received, the flow continues at block 808;

3) if regulated operations have not been suspended and a response has not been received, the flow continues at block 806; and 4) if regulated operations have not been suspended and a response has been received, the flow continues at block 810.

At block 806, the server 302 transmits, using a second communication protocol, an indication to suspend regulated operations to the wagering game machine 102. In one embodiment, the server 302 transmits the indication via a content signal 314, which can conform to the IEEE 802.11 protocol. The flow continues at block 802.

At block 808, the server 302 uses the second communication protocol to transmit to the wagering game machine 308 an indication to resume regulated operations. After the wagering game machine 308 receives the indication to resume, it can resume wagering games or other restricted operations that had been suspended. The flow continues at block 810.

At block 810, the server 302 uses a second communication protocol to transmit to the wagering game machine data associated with the regular the operations. For example, the server 302 can transmit wagering game content for use in presenting wagering games on the wagering game machine 308. The flow continues at block 802.

In the discussion above, FIGS. 7 and 8 describe operations for transmitting indications to disable and resume regulated operations on a wagering game machine. The discussion of FIG. 9 describes operations performed in response to receiving an indication to suspend regulated operations.

Figure 9:
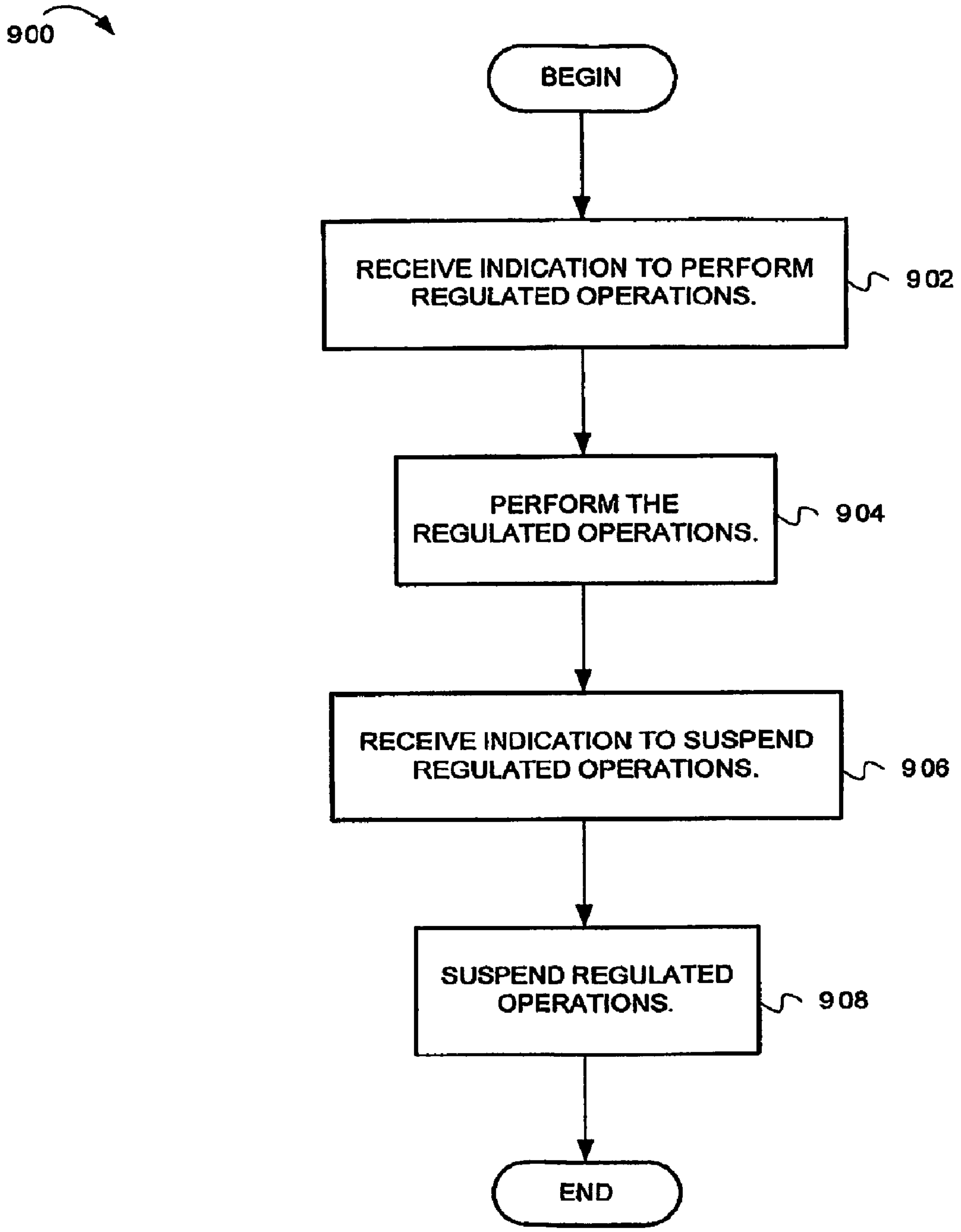
FIG. 9 is a flow diagram illustrating operations for responding to an indication to suspend regulated operations on a wagering game machine, according to example embodiments of the invention.

FIG. 9 is a flow diagram illustrating operations for responding to an indication to suspend regulated operations on a wagering game machine, according to example embodiments of the invention. In FIG. 9, the flow 900 begins at block 902.

At block 902, a wagering game machine 102 receives an indication to perform regulated operations. For example, the wagering game machine 102 receives, through a graphical user interface, a request to play a wagering game. The flow continues at block 904.

At block 904, the wagering game machine's content presentation unit 432 performs the regulated operations. For example, the wagering game machine's content presentation unit 432 presents the wagering game. The flow continues at block 906.

At block 906, the wagering game machine 102 receives an indication to suspend regulated operations. In one embodiment, the indication originates at the server 106. For example, the wagering game machine's regulated operations controller 436 receives a command (originating at the server 106) to stop presenting wagering games. The flow continues at block 908.

At block 908, the wagering game machine 102 suspends regulated operations. For example the content presentation unit 432 stops presenting wagering games until it receives further notice from the regulated operations controller 436.

Figure 10:
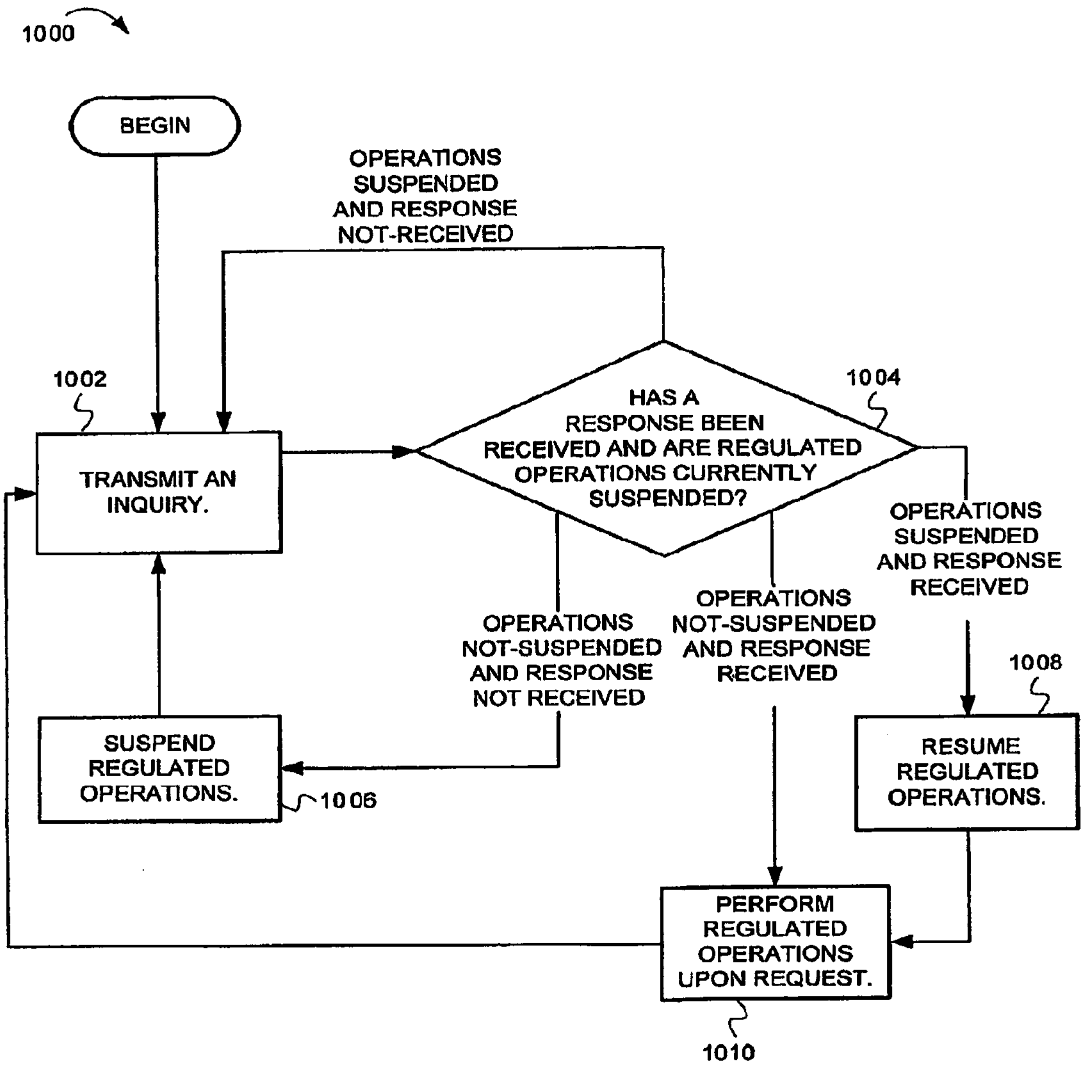
FIG. 10 is a flow diagram illustrating operations for suspending and resuming regulated operations in wagering game machine without communicating with a server, according to example embodiments of the invention.

This description continues with a discussion of FIG. 10, which describes embodiments in which a wagering game machine can suspend regulated operations without receiving indications from a server. The discussion of FIG. 10 will make reference to the network shown in FIGS. 2 and 4.

FIG. 10 is a flow diagram illustrating operations for suspending and resuming regulated operations in wagering game machine without communicating with a server, according to example embodiments of the invention. In FIG. 10, the flow 1000 begins at block 1002.

At block 1002, a wagering game machine's regulated operations controller 436 transmits an inquiry to another network device. In one embodiment, the wagering game machine 208 transmits an inquiry to the RFID tags 210. The flow continues at block 1004.

At block 1004, the regulated operations controller 436 of the wagering game machine 208 determines whether it has received a response to the inquiry and whether regular operations are currently suspended. In one embodiment, the regulated operations controller 436 determines whether it has received a response for an RFID tag 210 and whether regular operations are currently suspended.

There are four paths leaving block 1004; 1) if regulated operations are suspended and a response has not been received, the flow continues at block 1002; 2) if operations have been suspended and a response has been received, the flow continues at block 1008; 3) if operations have not been suspended and response has been received, the flow continues at block 1010; and 4) if operations have not been suspended and a response has not been received, the flow continues at block 1006.

At block 1006, the regulated operations controller 436 suspends regulated operations. For example, the regulated operations controller 436 stops the content presentation unit 432 from presenting wagering games and/or licensed content. The flow continues at block 1002.

At block 1008, after determining operations have been suspended and a response has been received (see block 1004), the regulated operations controller 436 allows the content presentation unit 432 to resume regulated operations, such as presenting wagering games and/or licensed content. The flow continues at block 1010.

At block 1010, the content presentation unit 432 performs regulated operations upon request. For example, in response to a request to present a wagering game (e.g., received from a player through a GUI), the content presentation unit 432 presents the wagering game. From block 1010, the flow ends.

Example Wagering Game Machines

Figure 11:
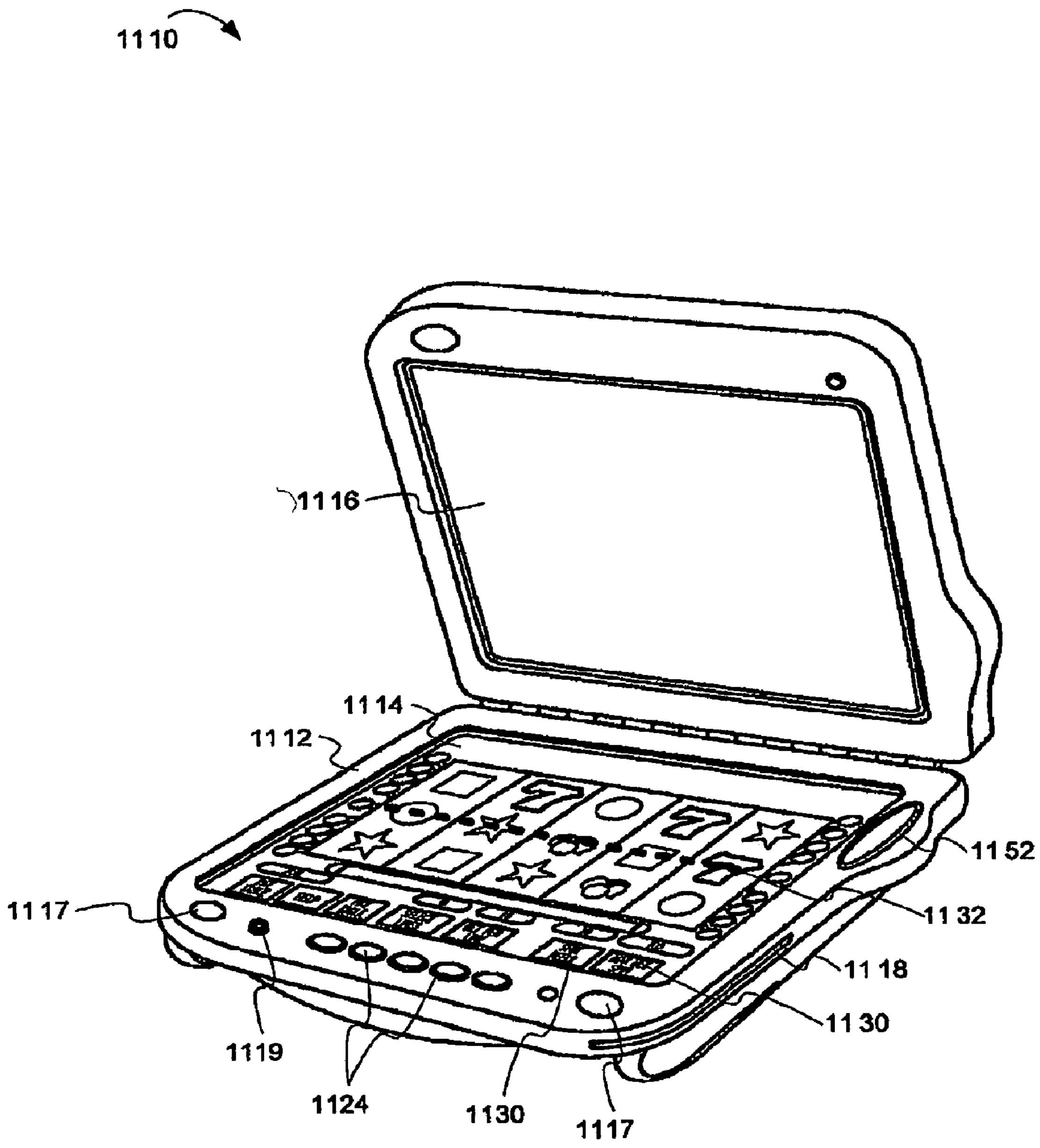
FIG. 11 shows an example embodiment of a wagering game machine 1110.

FIG. 11 shows an example embodiment of a wagering game machine 1110. Like free standing wagering game machines, in a handheld or mobile form, the wagering game machine 1110 can include any suitable electronic device configured to play a video casino games such as blackjack, slots, keno, poker, blackjack, and roulette. The wagering game machine 1110 comprises a housing 1112 and includes input devices, including a value input device 1118 and a player input device 1124. For output, the wagering game machine 1110 includes a primary display 1114, a secondary display 1116, one or more speakers 1117, one or more player-accessible ports 1119 (e.g., an audio output jack for headphones, a video headset jack, etc.), and other conventional I/O devices and ports, which may or may not be player-accessible. In the embodiment depicted in FIG. 11, the wagering game machine 1110 comprises a secondary display 1116 that is rotatable relative to the primary display 1114. The optional secondary display 1116 can be fixed, movable, and/or detachable/attachable relative to the primary display 1114. Either the primary display 1114 and/or secondary display 1116 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 1118 can comprise, for example, a slot located on the front, side, or top of the casing 1112 configured to receive credit from a stored-value card (e.g., casino card, smart card, debit card, credit card, optical or magnetic or memory based cards, etc.) inserted by a player. The player-accessible value input device 1118 can also comprise a sensor (e.g., an RF sensor) configured to sense a signal (e.g., an RF signal) output by a transmitter (e.g., an RF transmitter) carried by a player. The player-accessible value input device 1118 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 1110.

Still other player-accessible value input devices 1118 can require the use of touch keys 1130 on the touch-screen display (e.g., primary display 1114 and/or secondary display 1116) or player input devices 1124. Upon entry of player identification information and, preferably, secondary authorization information (e.g., a password, PIN number, stored value card number, predefined key sequences, etc.), the player can be permitted to access a player's account. As one potential optional security feature, the wagering game machine 1110 can be configured to permit a player to only access an account the player has specifically set up for the wagering game machine 1110. Other conventional security features can also be utilized to, for example, prevent unauthorized access to a player's account, to minimize an impact of any unauthorized access to a player's account, or to prevent unauthorized access to any personal information or funds temporarily stored on the wagering game machine 1110.

The player-accessible value input device 1118 can itself comprise or utilize a biometric player information reader which permits the player to access available funds on a player's account, either alone or in combination with another of the aforementioned player-accessible value input devices 1118. In an embodiment wherein the player-accessible value input device 1118 comprises a biometric player information reader, transactions such as an input of value to the wagering game machine 1110, a transfer of value from one player account or source to an account associated with the wagering game machine 1110, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 1118 comprising a biometric player information reader can require a confirmatory entry from another biometric player information reader 1152, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 1118 can be provided remotely from the wagering game machine 1110.

The player input device 1124 comprises a plurality of push buttons on a button panel for operating the wagering game machine 1110. In addition, or alternatively, the player input device 1124 can comprise a touch screen mounted to a primary display 1114 and/or secondary display 1116. In one aspect, the touch screen is matched to a display screen having one or more selectable touch keys 1130 selectable by a user's touching of the associated area of the screen using a finger or a tool, such as a stylus pointer. A player enables a desired function either by touching the touch screen at an appropriate touch key 1130 or by pressing an appropriate push button on the button panel. The touch keys 1130 can be used to implement the same functions as push buttons. Alternatively, the push buttons can provide inputs for one aspect of the operating the game, while the touch keys 1130 can allow for input needed for another aspect of the game. The various components of the wagering game machine 1110 can be connected directly to, or contained within, the casing 1112, as seen in FIG. 11, or can be located outside the casing 1112 and connected to the casing 1112 via a variety of wired (tethered) or wireless connection methods. Thus, the wagering game machine 1110 can comprise a single unit or a plurality of interconnected (e.g., wireless connections) parts which can be arranged to suit a player's preferences.

The operation of the basic wagering game on the wagering game machine 1110 is displayed to the player on the primary display 1114. The primary display 1114 can also display the bonus game associated with the basic wagering game. The primary display 1114 preferably takes the form of a high resolution LCD, a plasma display, an LED, or any other type of display suitable for use in the wagering game machine 1110. The size of the primary display 1114 can vary from, for example, about a 2-3" display to a 15" or 17" display. In at least some embodiments, the primary display 1114 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 1114 and/or secondary display 1116 can have a 16:9 aspect ratio or other aspect ratio (e.g., 4:3). The primary display 1114 and/or secondary display 1116 can also each have different resolutions, different color schemes, and different aspect ratios.

As with the free standing embodiments a wagering gaming machine, a player begins play of the basic wagering game on the wagering game machine 1110 by making a wager (e.g., via the value input device 1118 or an assignment of credits stored on the handheld gaming machine via the touch screen keys 1130, player input device 1124, or buttons) on the wagering game machine 1110. In some embodiments, the basic game can comprise a plurality of symbols arranged in an array, and includes at least one payline 1132 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 1118 of the wagering game machine 1110 can double as a player information reader that allows for identification of a player by reading a card with information indicating the player's identity (e.g., reading a player's credit card, player ID card, smart card, etc.). The player information reader can alternatively or also comprise a bar code scanner, RFID transceiver or computer readable storage medium interface. In one embodiment, the player information reader comprises a biometric sensing device.

General

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as falling within the inventive subject matter, which is set forth in the following claims.

The invention claimed is:

1. A wireless wagering game machine comprising:

a wireless network interface unit configured to receive a content signal, including data, from a wireless content provider, wherein the wireless content provider includes at least one of a content signal access point, an RFID tag or an RFID transceiver;

a content presentation unit to perform regulated operations using the data included in the content signal; and a regulated operations controller configured to determine quality of the content signal, to suspend performance of the regulated operations after the quality of the content signal falls below a quality threshold, and to resume performance of the regulated operations after the quality of the content signal rises above the quality threshold;

wherein the regulated operations controller is configured to suspend the regulated operations before the wireless wagering game machine is out of range of the wireless content provider.

2. The wagering game machine of claim 1 further comprising:

a user interface to present an indication that regulated operations will be suspended, the user interface to present the indication before the regulated operations are suspended by the regulated operations controller.

3. The wagering game machine of claim 1, wherein the regulated operations include presentation of wagering games upon which monetary value can be wagered.

4. A nontransitory machine-readable storage medium including instructions which when executed cause a machine to perform operations comprising:

receiving, at a wireless wagering game machine, a wireless content signal associated with regulated operations of the wireless wagering game machine;

determining whether a wireless enable signal generated by one or more enable signal transceivers has been detected by the wireless gaming machine;

if the wireless enable signal has been detected by the wireless gaming machine, performing regulated operations on the wireless gaming machine; and if the wireless enable signal has not been detected by the wireless gaming machine, suspending performance of the regulated operations on the wireless wagering game machine;

wherein suspending includes suspending the regulated operations before the wireless wagering game machine is out of range of the enable signal transceivers.

5. The machine-readable storage medium of claim 4, wherein determining whether a wireless enable signal generated by one or more enable signal transceivers has been detected by the wireless gaming machine includes determining that the wireless enable signal generated by one or more enable signal transceivers has not been detected by the wireless gaming machine if a quality of the enable signal is below a quality threshold; and wherein suspending performance includes presenting an indication that the regulated operations will be suspended.

6. The machine-readable storage medium of claim 4, the operations further comprising:

after suspending performance of the regulated operations, resuming performance of the regulated operations.

7. The machine-readable storage medium of claim 4, the operations further comprising:

after suspending performance of the regulated operations, detecting the enable signal.

8. The machine-readable storage medium of claim 4, wherein performing regulated operations include presenting a wagering game upon which monetary value can be wagered.

9. The machine-readable storage medium of claim 4, wherein the content signal has a broader range than the enable signal.

10. The machine-readable storage medium of claim 4, wherein the content signal is a Wi-Fi signal.

11. The machine-readable storage medium of claim 4, wherein the enable signal conforms to a protocol selected from the group consisting of RFID, Bluetooth, Wireless USB, and Infrared Data Association.

12. The machine-readable storage medium of claim 4, wherein the regulated operations are selected from the group consisting of presenting a wagering game, receiving a wager associated with a wagering game, and presenting copyrighted content.

13. The machine-readable storage medium of claim 4, wherein the suspending performance of the regulated operations includes writing contents of a main memory to a storage device and displaying in a graphical user interface an indication that the regulated operations will be suspended.

14. A method comprising:

presenting, on a wireless wagering game machine, a wagering game using data received in a wireless content signal;

determining, within the wireless wagering game machine, whether the presenting is occurring within an area in which wagering game presentations are permitted, wherein determining includes determining whether a wireless enable signal generated by a short range enable signal transceiver has been detected by the wireless wagering game machine; and after determining the presenting is not occurring within an area in which wagering game presentations are permitted, suspending the presenting of the wagering game on the wagering game machine.

15. The method of claim 14 further comprising:

after suspending the presenting of the wagering game, resuming the presenting of the wagering game when the wireless enable signal is detected again.

16. The method of claim 14, wherein the determining whether the presenting is occurring within an area in which wagering game presentations are permitted includes, determining whether a quality of the content signal has dropped below a quality threshold.

17. The method of claim 14, wherein the wireless enable signal has a lesser range than the wireless content signal.

18. The method of claim 14, wherein determining whether a wireless enable signal generated by a short range enable signal transceiver has been detected includes querying one or more RFID tags and determining whether a response is received from the RFID tags.

19. The method of claim 14, wherein the suspending includes presenting an indication that the wagering game is being presented in an area in which wagering games are prohibited and that the wagering game presentations will be suspended.

20. The method of claim 14, wherein the wireless enable signal conforms to a protocol selected from the group consisting of RFID, Bluetooth, Wireless USB, and Infrared Data Association.

* * * * *

UNITED STATES PATENT AND TRADEMARK OFFICE

CERTIFICATE OF CORRECTION

PATENT NO. : 8,197,338 B2
APPLICATION NO. : 12/280139
DATED : June 12, 2012
INVENTOR(S) : Fitzsimons et al.

It is certified that error appears in the above-identified patent and that said Letters Patent is hereby corrected as shown below:

In column 2, line 58, delete “Gaining”, and insert --Gaming--, therefor

In column 12, line 11, delete “1004;”, and insert --1004:--, therefor

In column 12, line 44, after “poker,”, delete “blackjack,”, therefor

Signed and Sealed this
Twenty-fifth Day of September, 2012

David J. Kappos
*Director of the United States Patent and Trademark Office*